(12) United States Patent  (10) Patent No.: US 6,505,847 B1
Greene  (45) Date of Patent: Jan. 14, 2003

(54) FRAME WITH BUILT-IN SUSPENSION

(75) Inventor: Aaron Greene, Reno, NV (US)

(73) Assignee: Paramount Custom Cycles, Reno, NV (US)

( * ) Notice: Subject to any disclaimer, the term of this patent is extended or adjusted under 35 U.S.C. 154(b) by 0 days.

(21) Appl. No.: 09/978,254

(22) Filed: Oct. 15, 2001

(51) Int. Cl.[7] .............................................. B62K 25/10
(52) U.S. Cl. ...................................... 280/284; 280/286
(58) Field of Search ................................ 180/218–219, 180/227; 280/284–286, 288

(56) References Cited

U.S. PATENT DOCUMENTS

| | | | |
|---|---|---|---|
| 2,252,866 A | | 8/1941 | Schleicher |
| 3,877,539 A | | 4/1975 | Tilkens |
| 4,022,484 A | | 5/1977 | Davis |
| 4,327,930 A | * | 5/1982 | Tominaga et al. ........... 280/284 |
| 4,378,857 A | * | 4/1983 | Andersson ................... 280/284 |
| 4,679,811 A | | 7/1987 | Shuler |
| 4,727,951 A | | 3/1988 | Morioka et al. |
| 5,469,930 A | * | 11/1995 | Wiers .......................... 180/219 |
| 5,487,443 A | | 1/1996 | Thurm |
| 5,725,226 A | | 3/1998 | Cabrerizo-Pariente |
| 5,772,228 A | | 6/1998 | Owyang |
| 5,816,356 A | * | 10/1998 | Jansson et al. .............. 180/227 |
| 6,003,628 A | | 12/1999 | Jurrens et al. |
| 6,290,017 B1 | * | 9/2001 | Ito ............................... 180/227 |
| 6,357,546 B1 | * | 3/2002 | Crosby, Jr. .................. 280/284 |

* cited by examiner

Primary Examiner—Daniel G. DePumpo
Assistant Examiner—Matthew Luby
(74) Attorney, Agent, or Firm—Townsend and Townsend and Crew LLP

(57) ABSTRACT

The present invention is directed to a suspension mechanism that is built into the rigid frame members of a vehicle such as a motorcycle to provide a softer ride while preserving the clean look of the rigid frame. The vehicle has a wheel mount for a wheel, a steering head for a steering handle, and a vehicle frame. The suspension mechanism comprises a lower frame member of the vehicle frame extending from the wheel mount, and an upper frame member of the vehicle frame extending from the wheel mount and being disposed above the lower frame member. An upper frame arm of the vehicle frame extends from the steering head and is movably coupled with the upper frame member at a location between the steering head and the wheel mount. The upper frame member is slidable relative to the upper frame arm along an upper arcuate path centered around a pivot axis disposed between the upper frame member and the lower frame member. The upper frame arm may include a shock absorber coupled with the upper frame member to absorb shock during movement of the upper frame arm relative to the upper frame member. In specific embodiments, a lower frame arm of the vehicle frame extends from the steering head and is movably coupled with the lower frame member at a location between the steering head and the wheel mount. The lower frame member is slidable relative to the lower frame arm along a lower arcuate path centered around the pivot axis.

20 Claims, 9 Drawing Sheets

FRAME WITH BUILT-IN SUSPENSION

BACKGROUND OF THE INVENTION

The present invention relates generally to suspension apparatus and, more particularly, to a suspension apparatus built into the frame of a motorcycle or the like.

Rigid frame motorcycles have a "clean" look that is preferred by many riders, such as the wishbone style frame shown in FIG. 1. Incorporating a suspension mechanism, for instance, by attaching a shock absorber between the upper and lower members of the frame, ruins the look.

BRIEF SUMMARY OF THE INVENTION

The present invention is directed to a suspension mechanism that is built into the rigid frame members to provide a softer ride while preserving the clean look of the rigid frame.

An aspect of the present invention is directed to a suspension mechanism for a vehicle having a wheel mount for a wheel, a steering head for a steering handle, and a vehicle frame. The suspension mechanism comprises a lower frame member of the vehicle frame extending from the wheel mount, and an upper frame member of the vehicle frame extending from the wheel mount and being disposed above the lower frame member. An upper frame arm of the vehicle frame extends from the steering head and is movably coupled with the upper frame member at a location between the steering head and the wheel mount. The upper frame member is slidable relative to the upper frame arm along an upper arcuate path centered around a pivot axis disposed between the upper frame member and the lower frame member.

In some embodiments, the upper frame arm includes a shock absorber coupled with the upper frame member to absorb shock during movement of the upper frame arm relative to the upper frame member. The shock absorber comprises a hydraulic piston disposed in a hydraulic housing in the upper frame arm and a drive rod attached to the hydraulic piston. The hydraulic housing contains a compressed gas. The drive rod is coupled with the upper frame member to move the upper frame member relative to the upper frame arm from an unrotated position to a rotated position along the upper arcuate path.

In specific embodiments, the upper frame arm includes an upper guide channel forming the upper arcuate path, and the upper frame member includes at least one upper guide pin connected with the upper guide channel to slide along the upper guide channel. The upper frame member is slidable relative to the upper frame arm along the upper arcuate path between an unrotated position and a rotated position. The upper frame member and the upper frame arm are substantially aligned in the unrotated position.

In some embodiments, a lower frame arm of the vehicle frame extends from the steering head and is movably coupled with the lower frame member at a location between the steering head and the wheel mount. The lower frame member is slidable relative to the lower frame arm along a lower arcuate path centered around the pivot axis. The lower frame arm includes a plurality of lower guide channels, and the lower frame member includes a plurality of lower guide pins each connected with one of the plurality of lower guide channels to slide along each lower guide channel relative to the lower frame arm along the lower arcuate path. The lower frame member is slidable relative to the lower frame arm along the lower arcuate path between an unrotated position and a rotated position. The lower frame member and the lower frame arm are substantially aligned in the unrotated position.

In accordance with another aspect of the invention, a suspension mechanism for a vehicle comprises a lower frame member of the vehicle frame extending from the wheel mount, and a lower frame arm of the vehicle frame extending from the steering head and being movably coupled with the lower frame member at a location between the steering head and the wheel mount. The suspension mechanism further comprises an upper frame member of the vehicle frame extending from the wheel mount and being disposed above the lower frame member, and an upper frame arm of the vehicle frame extending from the steering head and being movably coupled with the upper frame member at a location between the steering head and the wheel mount. The upper frame member is movable relative to the upper frame arm and the lower frame member is movable relative to the lower frame arm, both in rotation centered around a pivot axis disposed between the upper frame arm and the lower frame arm.

In accordance with another aspect of the present invention, a suspension mechanism for a vehicle comprises an upper frame member of the vehicle frame extending from the wheel mount, and an upper frame arm of the vehicle frame extending from the steering head and being movably coupled with the upper frame member at a location between the steering head and the wheel mount. The upper frame member is slidable relative to the upper frame arm along an upper arcuate path centered around a pivot axis disposed below the upper frame arm and between the steering head and the wheel mount. The upper frame arm comprises a tube which houses a shock absorber, which is coupled with the upper frame member to absorb shock during movement of the upper frame arm relative to the upper frame member.

In some embodiments, the upper frame arm includes an upper guide channel forming the upper arcuate path, and the upper frame member includes a plurality of upper guide pins connected with the upper guide channel to slide along the upper guide channel. The upper frame arm includes a retainer member which retains the upper guide pins in the upper guide channel to move along the upper guide channel. The upper frame arm includes a Teflon slide plate in the upper guide channel on which the upper guide pins slide. At least one bearing is disposed between the upper frame member and the upper frame arm to facilitate sliding movement therebetween.

DETAILED DESCRIPTION OF THE INVENTION

Figure 1:
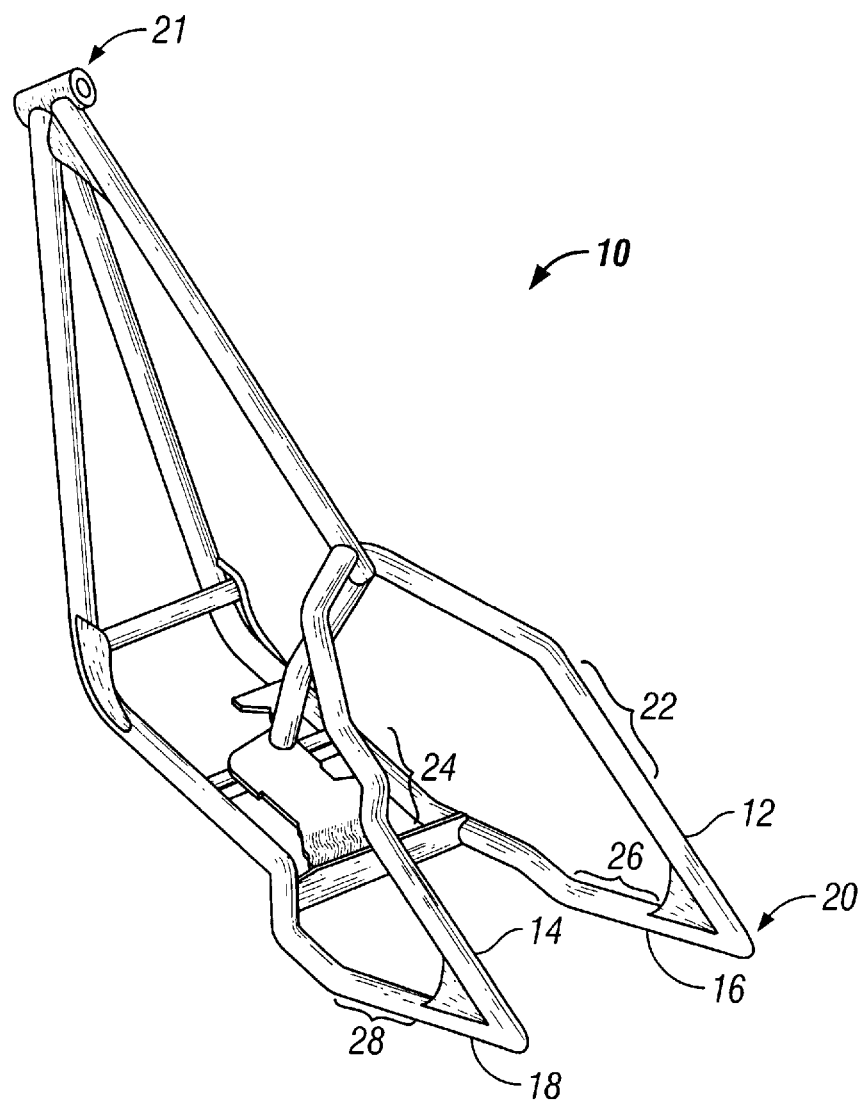
FIG. 1 is a perspective view of a motorcycle frame 10 according to an embodiment of the present invention.
Figure 1A:
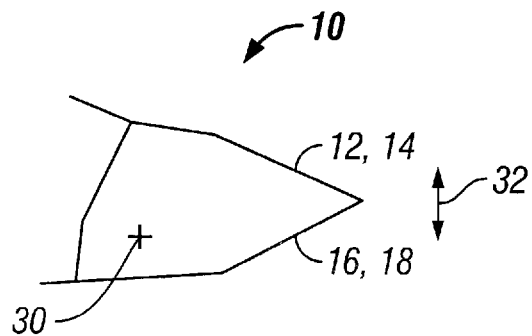
FIG. 1A is a schematic view of the motorcycle frame 10 illustrating the location of the pivot axis 30 according to a specific embodiment of the invention.

FIG. 1 shows a rigid frame 10 of a motorcycle having at the rear a pair of upper frame members 12, 14 connected respectively to a pair of lower frame members 16, 18 at a wheel mount 20. The frame 10 extends between the wheel mount 20 and the steering head 21. The members 12–18 are typically tubes made of, for example, stainless steel or the like. In one embodiment, two built-in suspension mechanisms are installed in the upper members 12, 14 at locations 22, 24. Alternatively or additionally, two built-in suspension mechanisms are installed in the lower members 16, 18 at locations 26, 28. The suspension mechanisms allow the rear portion of the frame 10 to pivot relative to the remainder of the motorcycle with respect to a pivot axis, which is typically located at or near the transmission of the motorcycle. FIG. 1A is a schematic view of the rigid frame 10 illustrating the location of the pivot axis 30 disposed between the upper frame and the lower frame according to a specific embodiment. The suspension mechanisms are configured with the pivot axis 30 as the reference to provide the desired pivot movement 32.

Figure 2:
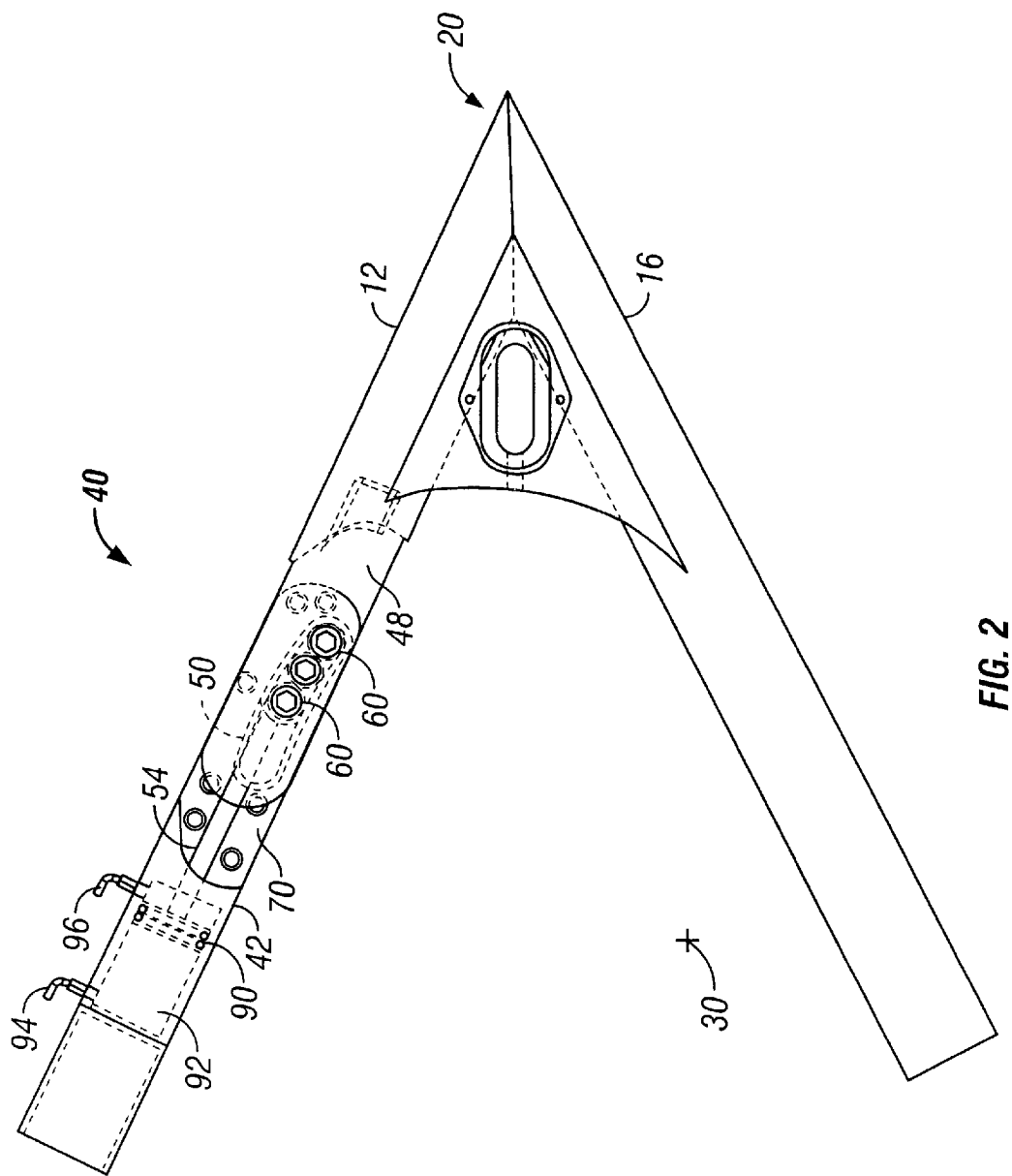
FIG. 2 is an elevational view of an upper suspension mechanism 40 in an original, unrotated position for the motorcycle frame of FIG. 1 according to an embodiment of the present invention.
Figure 3:
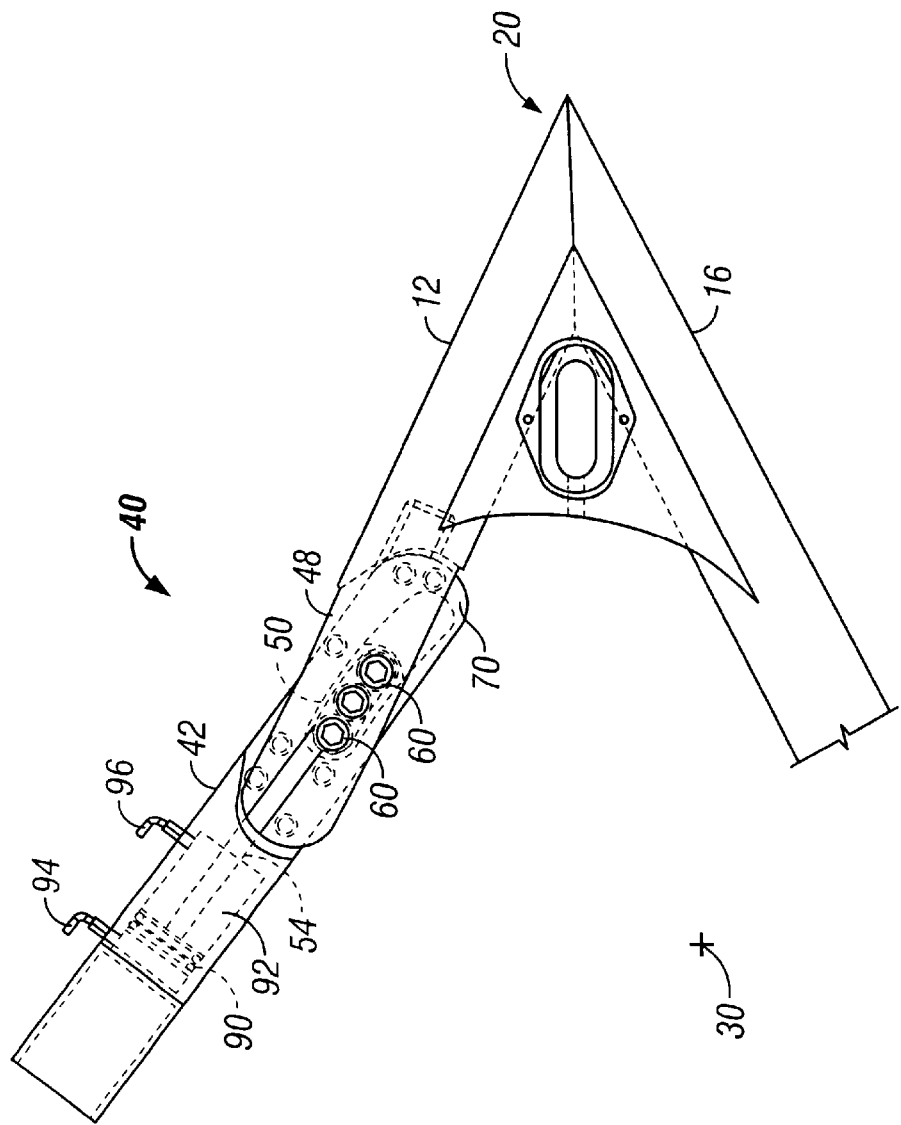
FIG. 3 is an elevational view of the upper suspension mechanism 40 of FIG. 2 in a fully rotated position.
Figures 4, 4A:
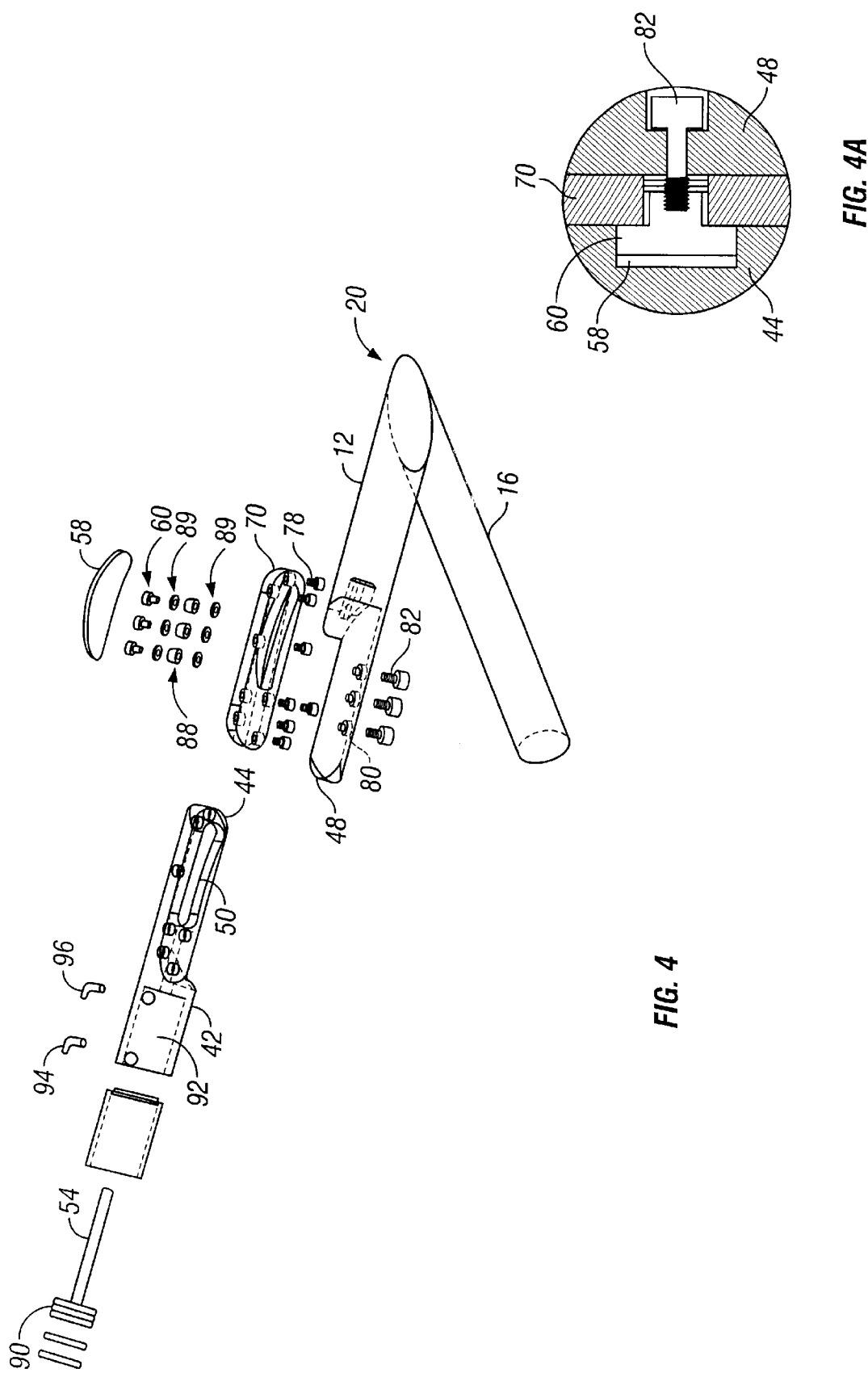
FIG. 4 is an exploded perspective view of the upper suspension mechanism 40 of FIG. 2.
FIG. 4A is a cross-sectional view of the upper suspension mechanism 40 of FIG. 2.

FIGS. 2–4 show an upper suspension mechanism 40 built into the upper member 12 of the frame 10. A similar built-in suspension mechanism may be provided in the other upper member 14 which would be a mirror image of the mechanism 40 for the upper member 12. FIG. 2 shows the mechanism 40 in an original, unrotated position, while FIG. 3 shows the mechanism 40 in a fully rotated position to provide the rear axle with the maximum lift or travel.

Figure 5:
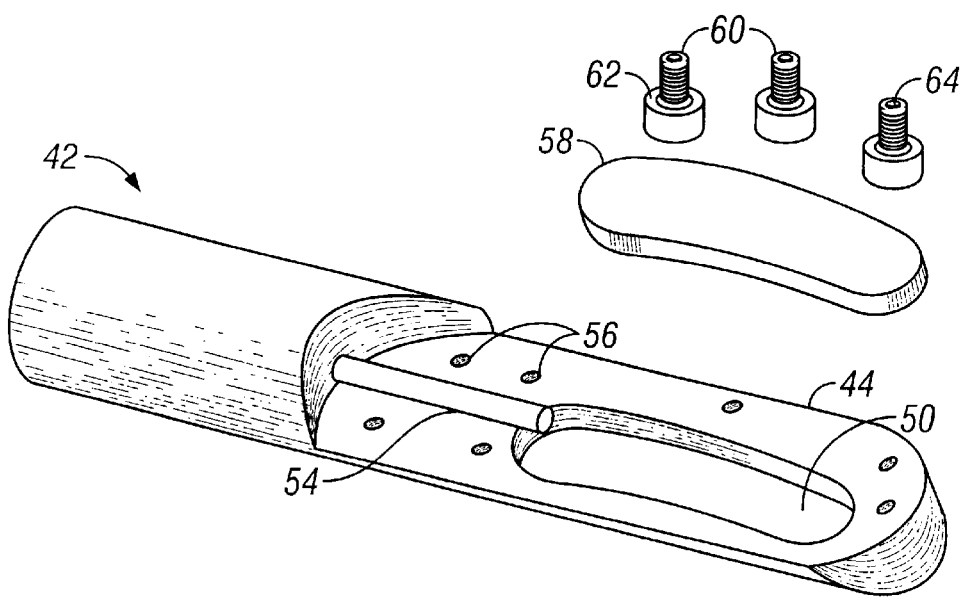
FIG. 5 is a perspective view of an upper suspension arm 42 of the upper suspension mechanism 40 of FIG. 2.

As shown in FIGS. 2–4, the upper suspension mechanism 40 includes an upper suspension arm 42, which includes an outer extension 44 that overlaps with and is rotatably coupled with an inner extension 48 of the upper member 12 to pivot around the pivot axis 30. As best seen in FIG. 5, the outer extension 44 of the upper arm 42 includes a guide channel or cavity 50 which is desirably arcuate with a curvature centered at or near the pivot axis 30 (FIGS. 2–3). The outer extension 44 has a plurality of threaded cavities 56 for receiving fasteners. A guide slot receives a drive rod 54 which can move in and out of the guide channel 50, as discussed in more detail below. The guide channel 50 receives therein a slide plate 58 and at least one, preferably more than one, guide pin. FIGS. 2–5 show three guide pins 60, which slide on the slide plate 58. The use of multiple guide pins 60 avoids or minimizes fish-tailing as discussed below. The slide plate 58 facilitates low-friction sliding of the guide pins 60 in the guide channel 50, and is typically made of Teflon or the like. Each guide pin 60 has an enlarged head 62 forming a ledge around the body of the pin 60, and includes a threaded cavity 64 for receiving retaining fasteners as discussed below.

Figure 6:
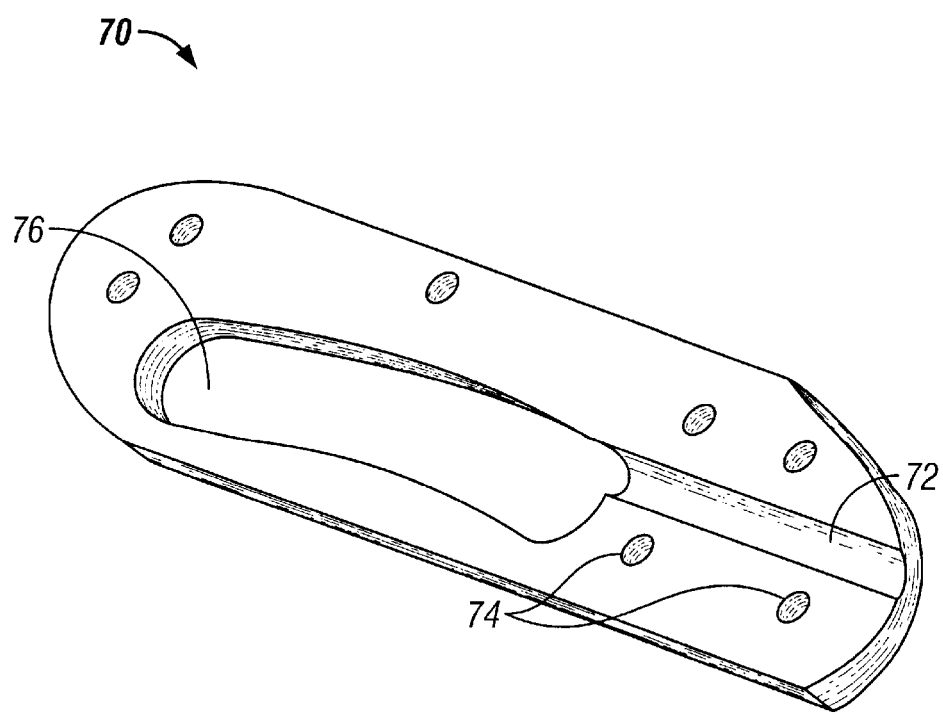
FIG. 6 is a perspective view of a retainer member 70 of the upper suspension mechanism 40 of FIG. 2.

The guide pins 60 are retained in the guide channel 50 by a retainer member 70, as shown in FIG. 4. FIG. 6 shows the outer side of the retainer member 70, which includes a guide slot 72 for receiving the drive rod 54 (see FIG. 5), a plurality of apertures 74 corresponding to the threaded cavities 56 of the upper arm 42, and an opening 76 through which the guide pins 60 extend and in which the guide pins 60 move. The retainer member 70 engages the ledges of the enlarged heads 62 of the guide pins 60 to retain the guide pins 60 in the guide channel 50. In the embodiment shown, the retainer member 70 is a plate shaped to match the outer extension 44 of the upper arm 42 to preserve the clean look. As shown in FIG. 4, a plurality of fasteners 78 attach the retainer member 70 to the outer extension 44 of the upper arm 42. As assembled, the retainer member 70 retains the guide pins 60 in the guide channel 50. The retainer member 70 as fastened to the upper arm 42 may provide some friction or drag for the guide pins 60 to reduce slop in the suspension mechanism, but provides sufficient clearance for the guide pins 60 to slide smoothly within the guide channel 50.

As shown in FIG. 4, the inner extension 48 of the upper member 12 includes three apertures 80 for receiving retaining fasteners 82, which threadingly engage the threaded cavities 64 of the guide pins 60 to attach the inner extension 48 to the guide pins 60. FIG. 4A more clearly shows the coupling between the outer extension 44 of the upper arm 42 and the inner extension 48 of the upper member 12, with the retainer member 70 therebetween, by the connection between the guide pins 60 and the retaining fasteners 82.

By attaching the inner extension 48 of the upper member 12 to the guide pins 60, the upper member 12 moves with the guide pins 60 as a unit relative to the upper suspension arm 42 as the guide pins 60 slide within the guide channel 50, as illustrated in FIG. 3. The use of multiple guide pins 60 avoids or minimizes fish-tailing during sliding movement relative to the upper suspension arm 42. Optionally, bearings 88 such as needle bearing rollers and washers 89 are provided between the retainer plate 70 and the inner extension 48 of the upper member 12. The bearings 88 facilitate smoother relative movement between the upper member 12 and the upper arm 42 with minimal friction and associated wear and tear.

The drive rod 54 is connected to at least one guide pin 60 to move the guide pin 60, and produces the rotational movement of the upper member 12 relative to the upper arm 42 from the initial position of FIG. 2 to the fully rotated position of FIG. 3. The drive rod 54 is attached to a piston 90 which is disposed in a piston housing 92 provided in the upper arm 42, as shown in FIGS. 2–4. The piston housing 92 has an upper gas opening 94 and a lower gas opening 96, which are in communication with one or more pressurized or compressed gas sources. In the initial position of FIG. 2, gas pressure from the upper gas opening 94 builds up in the piston housing 92 to maintain the drive rod 54 and the guide pins 60 in the downward position inside the guide channel 50. When gas flows into the lower gas opening 96 and out of the upper gas opening 94, the piston 90 moves upward to pull the drive rod 54 upward, which in turn allows the guide pins 60 to move upward to rotate the upper member 12 relative to the upper arm 42 to the position shown in FIG. 3. This occurs, for instance, when the motorcycle hits a bump.

The hydraulic piston 90 acts as a shock absorber for the frame 10. The drive rod 54 may be rotatably connected to one of the guide pins 60, or may simply bear against one guide pin 60 to form a simple contact.

Figure 7:
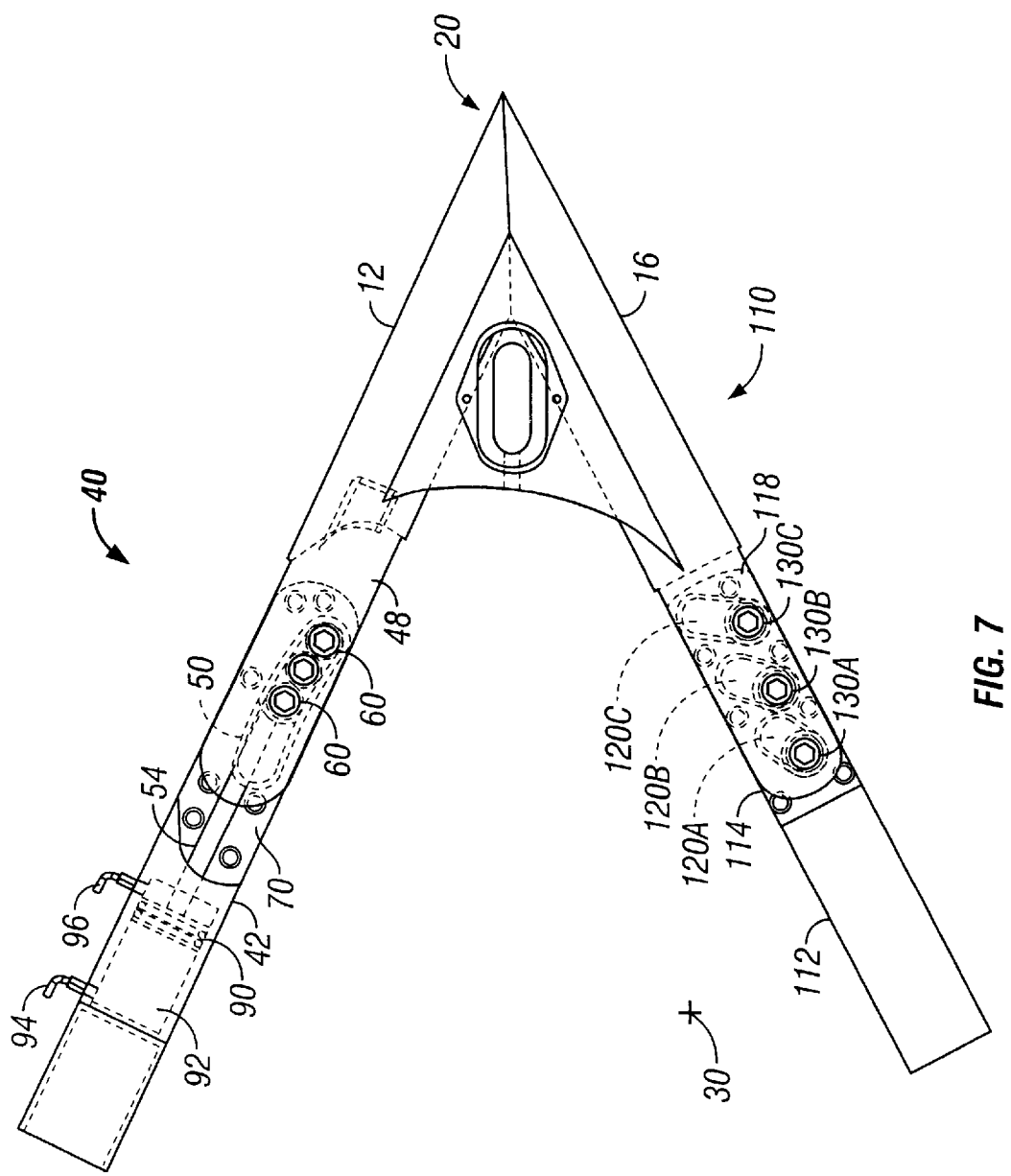
FIG. 7 is an elevational view of a lower suspension mechanism 110 and the upper suspension mechanism 40 in an original, unrotated position for the motorcycle frame of FIG. 1 according to another embodiment of the present invention.
Figure 8:
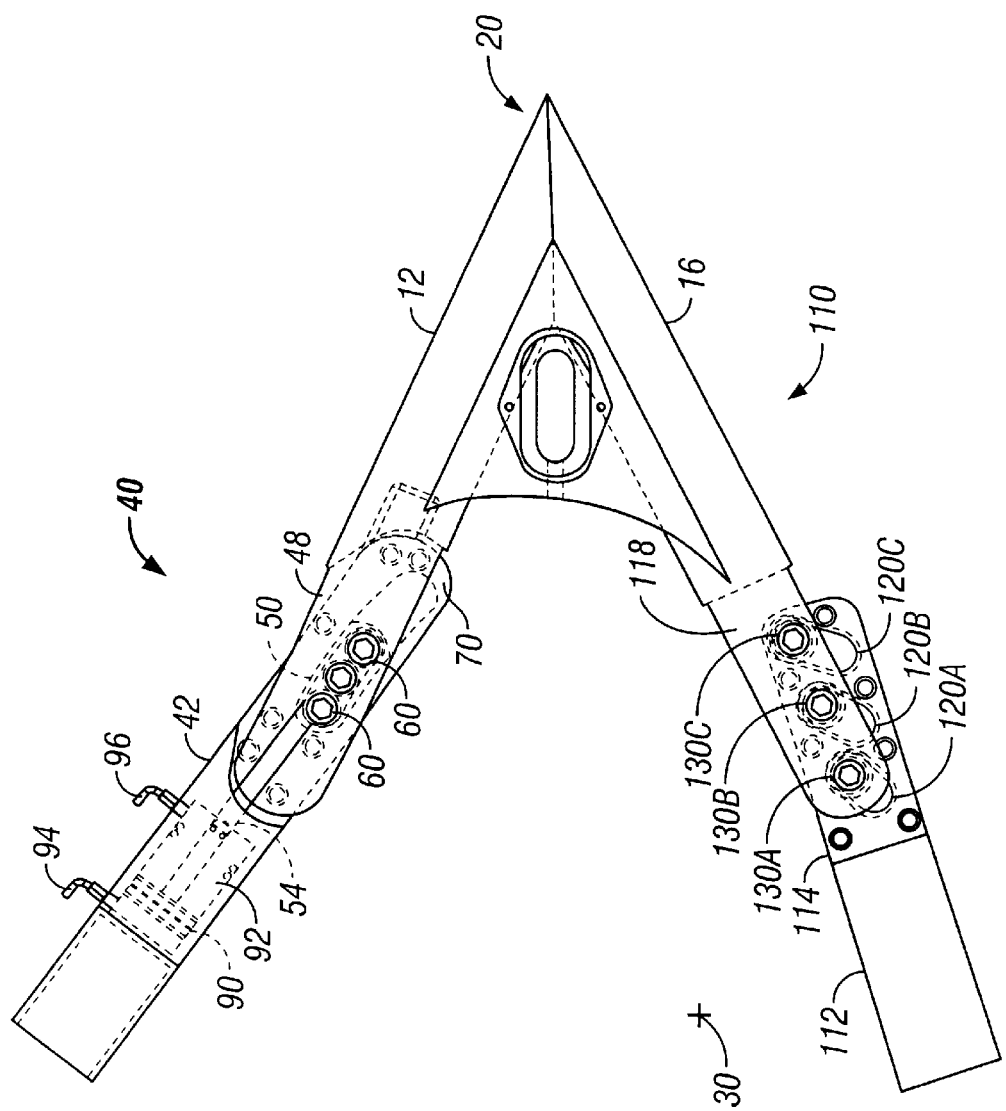
FIG. 8 is an elevational view of the lower suspension mechanism 110 and the upper suspension mechanism 40 of FIG. 7 in a fully rotated position.
Figure 9:
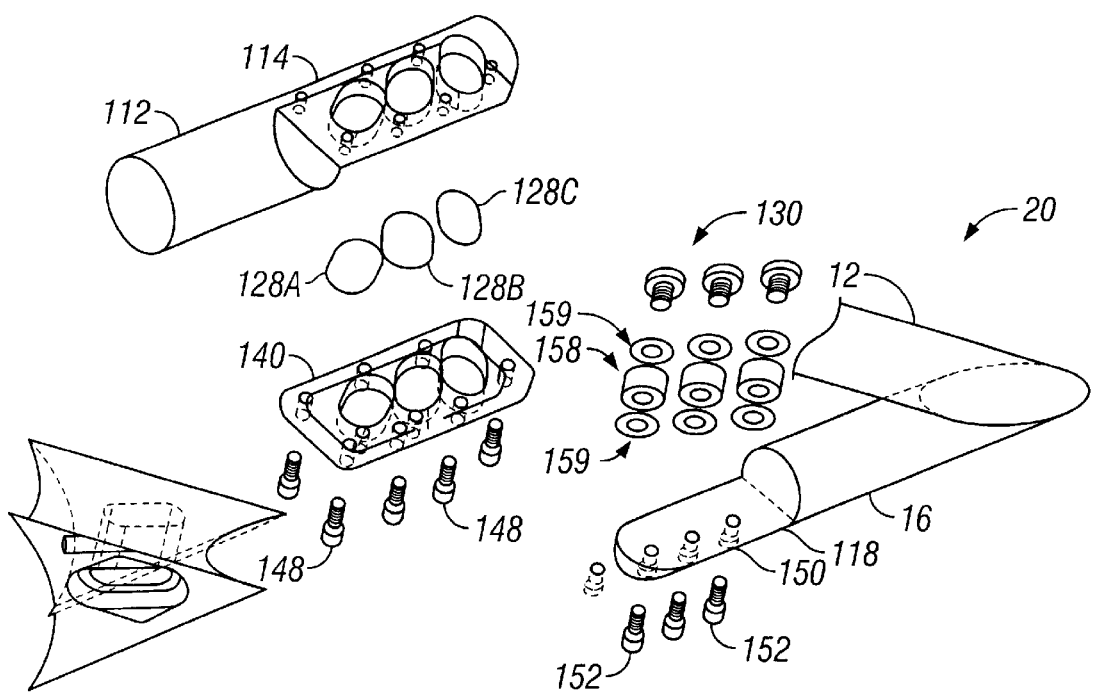
FIG. 9 is an exploded perspective view of the lower suspension mechanism 110 of FIG. 7.
Figure 10:
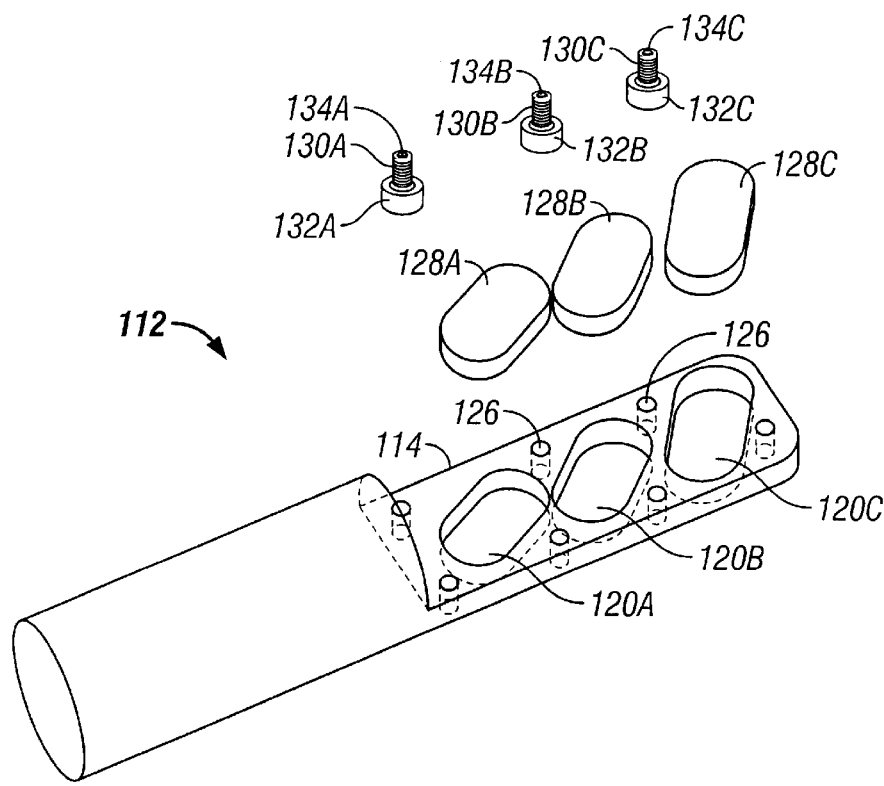
FIG. 10 is a perspective view of a lower suspension arm 112 of the lower suspension mechanism 110 of FIG. 7.

In another embodiment as shown in FIGS. 7–10, a lower suspension mechanism 110 is provided in addition to the upper suspension mechanism 40. The lower suspension mechanism 110 includes a lower suspension arm 112, which includes an outer extension 114 that overlaps with and is rotatably coupled with an inner extension 118 of the lower member 16 to pivot around the pivot axis 30. As best seen in FIG. 10, the outer extension 114 of the upper arm 112 includes at least one, desirably more than one, guide channel or cavity. FIG. 10 shows three guide channels 120A, 120B, 120C (or collectively 120). The guide channels 120 are desirably arcuate with curvatures centered at or near the pivot axis 30 (FIGS. 7–8). Because the guide channels 120 are relatively short, however, they may be straight or substantially straight. The outer extension 114 has a plurality of threaded cavities 126 for receiving fasteners.

The guide channels 120A, 120B, 120C receive therein slide plates 128A, 128B, 128C (or collectively 128), respectively, and guide pins 130A, 130B, 130C (or collectively 130), respectively. The slide plates 128 facilitate low-friction sliding of the guide pins 130 in the guide channels 120, and are typically made of Teflon or the like. Each guide pin 130 (130A, 130B, 130C) has an enlarged head 132 (132A, 132B, 132C) forming a ledge around the body of the pin, and a threaded cavity 134 (134A, 134B, 134C) for receiving retaining fasteners. The guide pins 130A, 130B, 130C are typically identical. The use of multiple guide pins 130 in multiple guide channels 120 avoids or minimizes fish-tailing as discussed below. In the embodiment shown, three separate guide channels 120A, 120B, 120C are used because geometric limitations of the structure do not permit the use of a single channel as in the upper suspension mechanism 40. In other embodiments where the location of the pivot center is different, it may be suitable to use a single channel.

Figure 11:
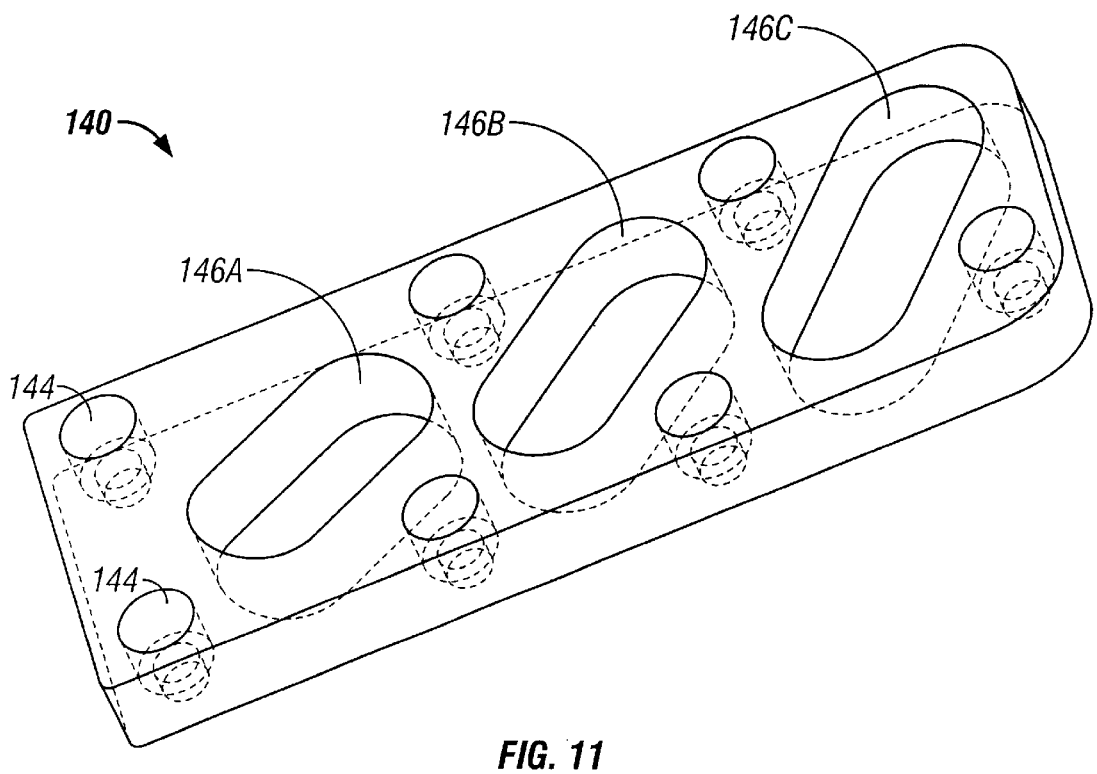
FIG. 11 is a perspective view of a retainer member 140 of the lower suspension mechanism 110 of FIG. 7.

The guide pins 130 are retained in the guide channel 120 by a retainer member 140, as shown in FIGS. 9 and 11. The retainer member 140 includes a plurality of apertures 144 corresponding to the threaded cavities 126 of the lower arm 112, and three openings 146A 146B, 146C through which the guide pins 130A, 130B, 130C extend and in which the guide pins 130A, 130B, 130C move, respectively. The retainer member 140 engages the ledges of the enlarged heads 132 of the guide pins 130 to retain the guide pins 130 in the guide channels 120. In the embodiment shown, the retainer member 140 is a plate shaped to match the outer extension 114 of the upper arm 112 to preserve the clean look. As shown in FIG. 9, a plurality of fasteners 148 attach the retainer member 140 to the outer extension 114 of the lower arm 112. As assembled, the retainer member 140 retains the guide pins 130 in the guide channels 120. The retainer member 140 as fastened to the lower arm 112 may provide some friction or drag for the guide pins 130 to reduce slop in the suspension mechanism, but provides sufficient clearance for the guide pins 130 to slide smoothly within the guide channels 120.

Figure 9A:
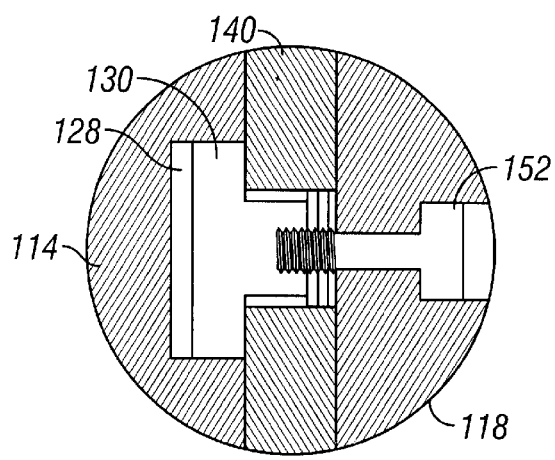
FIG. 9A is a cross-sectional view of the lower suspension mechanism 110 of FIG. 7.

As shown in FIG. 9, the inner extension 118 of the lower member 16 includes three apertures 150 for receiving retaining fasteners 152, which threadingly engage the threaded cavities 134 of the guide pins 130 to attach the inner extension 118 to the guide pins 130. FIG. 9A more clearly shows the coupling between the outer extension 114 of the lower arm 112 and the inner extension 118 of the lower member 16, with the retainer member 140 therebetween, by the connection between the guide pins 130 and the retaining fasteners 152.

By attaching the inner extension 118 of the lower member 16 to the guide pins 130, the lower member 16 moves with the guide pins 130 as a unit relative to the lower suspension arm 112 as the guide pins 130 slide within the guide channels 120, as illustrated in FIG. 8. The use of multiple guide pins 130 avoids or minimizes fish-tailing during sliding movement relative to the upper suspension arm 112. Optionally, bearings 158 such as needle bearing rollers and washers 159 are provided between the retainer plate 140 and the inner extension 118 of the lower member 16. The bearings 158 facilitate smoother relative movement between the lower member 16 and the lower arm 112 with minimal friction and associated wear and tear.

The upper suspension mechanism 40 of FIGS. 7–11 operates in the same way as the mechanism 40 of FIGS. 2–6, with the additional movement provided by the lower suspension system 110. The drive rod 54 is connected to at least one guide pin 60 to move the guide pin 60, and produces the rotational movement of the upper member 12 relative to the upper arm 42 and of the lower member 16 relative to the lower arm 112 from the initial position of FIG. 7 to the fully rotated position of FIG. 8. The drive rod 54 is attached to a piston 90 which is disposed in a piston housing 92 provided in the upper arm 42, as shown in FIGS. 7 and 8. The piston housing 92 has an upper gas opening 94 and a lower gas opening 96, which are in communication with one or more pressurized or compressed gas sources. In the initial position of FIG. 7, gas pressure from the upper gas opening 94 builds up in the piston housing 92 to maintain the drive rod 54 and the guide pins 60 in the downward position inside the guide channel 50. When gas flows into the lower gas opening 96 and out of the upper gas opening 94, the piston 90 moves upward to pull the drive rod 54 upward, which in turn allows the guide pins 60 to move upward to rotate the upper member 12 relative to the upper arm 42 to the position shown in FIG. 8. The drive rod 54 may be rotatably connected to one of the guide pins 60, or may simply bear against one guide pin 60 to form a simple contact.

The suspension system of the present invention allows travel or lift of the rear axle of up to about 3 inches or more in a typical motorcycle, depending on the configuration used. The upper frame member 12 and the upper frame arm 42 are substantially aligned in the unrotated position, and the lower frame member 16 and the lower frame arm 112 are substantially aligned in the unrotated position. The built-in suspension mechanisms preserve the clean look of the motorcycle frame 10. The suspension mechanisms are visible only during travel of the rear axle, and are not particularly noticeable. Cover plates or shells may be placed over the suspension mechanisms to hide the mechanisms from view during travel of the rear axle. The cover plates or shells need only be slightly larger than the portions of the frame at which the suspension mechanism are located.

Most of the components of the suspension mechanism may be made of stainless steel or the like. For more critical components such as the guide pins, titanium may preferably be used to ensure strength and durability.

It is to be understood that the above description is intended to be illustrative and not restrictive. Many embodiments will be apparent to those of skill in the art upon reviewing the above description. By way of example, the present invention may extend to built-in suspension apparatus for other vehicles such as bicycles. In that case, instead of an air compressor, a replaceable $CO_2$ cartridge may be used to pressurize the gas chamber to provide suspension. The $CO_2$ cartridge may be activated manually by manipulating a control provided on the handle bar to provide suspension when desired. The scope of the invention should, therefore, be determined not with reference to the above description, but instead should be determined with reference to the appended claims along with their full scope of equivalents.

What is claimed is:

1. A suspension mechanism for a vehicle having a wheel mount for a wheel, a steering head for a steering handle, and a vehicle frame, the suspension mechanism comprising:

a lower frame member of the vehicle frame extending from the wheel mount;

an upper frame member of the vehicle frame extending from the wheel mount and being disposed above the lower frame member; and an upper frame arm of the vehicle frame extending from the steering head and being movably coupled with the upper frame member at a location between the steering head and the wheel mount, the upper frame member being slidable relative to the upper frame arm along an upper arcuate path centered around a pivot axis disposed between the upper frame member and the lower frame member, the upper arcuate path being formed in an upper guide channel in one of the upper frame arm and the upper frame member.

2. The suspension mechanism of claim 1 wherein the upper frame arm includes a shock absorber coupled with the upper frame member to absorb shock during movement of the upper frame arm relative to the upper frame member.

3. The suspension mechanism of claim 2 wherein the shock absorber comprises a hydraulic piston disposed in a hydraulic housing in the upper frame arm and a drive rod attached to the hydraulic piston, the hydraulic housing containing a compressed gas, the drive rod being coupled with the upper frame member to move the upper frame member relative to the upper frame arm from an unrotated position to a rotated position along the upper arcuate path.

4. The suspension mechanism of claim 1 wherein the upper frame arm includes an upper guide channel forming the upper arcuate path, and wherein the upper frame member includes at least one upper guide pin connected with the upper guide channel to slide along the upper guide channel.

5. The suspension mechanism of claim 4 wherein the upper frame member comprises a plurality of upper guide pins connected with the upper guide channel to slide along the upper guide channel.

6. The suspension mechanism of claim 1 wherein the upper frame member is slidable relative to the upper frame arm along the upper arcuate path between an unrotated position and a rotated position, the upper frame member and the upper frame arm being substantially aligned in the unrotated position.

7. A suspension mechanism for a vehicle having a wheel mount for a wheel, a steering head for a steering handle, and a vehicle frame, the suspension mechanism comprising:

a lower frame member of the vehicle frame extending from the wheel mount;

an upper frame member of the vehicle frame extending from the wheel mount and being disposed above the lower frame member;

an upper frame arm of the vehicle frame extending from the steering head and being movably coupled with the upper frame member at a location between the steering head and the wheel mount, the upper frame member being slidable relative to the upper frame arm along an upper arcuate path centered around a pivot axis disposed between the upper frame member and the lower frame member; and a lower frame arm of the vehicle frame extending from the steering head and being movably coupled with the lower frame member at a location between the steering head and the wheel mount, the lower frame member being slidable relative to the lower frame arm along a lower arcuate path centered around the pivot axis.

8. The suspension mechanism of claim 7 wherein the lower frame arm includes at least one lower guide channel, and wherein the lower frame member includes at least one lower guide pin connected with the at least one lower guide channel to slide along the lower guide channel relative to the lower frame arm along the lower arcuate path.

9. The suspension mechanism of claim 8 wherein the lower frame arm includes a plurality of lower guide channels, and wherein the lower frame member includes a plurality of lower guide pins each connected with one of the plurality of lower guide channels to slide along each lower guide channel relative to the lower frame arm along the lower arcuate path.

10. The suspension mechanism of claim 7 wherein the lower frame member is slidable relative to the lower frame arm along the lower arcuate path between an unrotated position and a rotated position, the lower frame member and the lower frame arm being substantially aligned in the unrotated position.

11. A suspension mechanism for a vehicle having a wheel mount for a wheel, a steering head for a steering handle, and a vehicle frame, the suspension mechanism comprising:

a lower frame member of the vehicle frame extending from the wheel mount;

a lower frame arm of the vehicle frame extending from the steering head and being movably coupled with the lower frame member at a location between the steering head and the wheel mount;

an upper frame member of the vehicle frame extending from the wheel mount and being disposed above the lower frame member; and an upper frame arm of the vehicle frame extending from the steering head and being movably coupled with the upper frame member at a location between the steering head and the wheel mount, wherein the upper frame member is movable relative to the upper frame arm and the lower frame member is movable relative to the lower frame arm, both in rotation centered around a common pivot axis disposed between the upper frame arm and the lower frame arm.

12. The suspension mechanism of claim 11 wherein the upper frame arm includes a shock absorber coupled with the upper frame member to absorb shock during movement of the upper frame arm relative to the upper frame member and movement of the lower frame arm relative to the lower frame member.

13. A suspension mechanism for a vehicle having a wheel mount for a wheel, a steering head for a steering handle, and a vehicle frame, the suspension mechanism comprising:

a lower frame member of the vehicle frame extending from the wheel mount;

a lower frame arm of the vehicle frame extending from the steering head and being movably coupled with the lower frame member at a location between the steering head and the wheel mount;

an upper frame member of the vehicle frame extending from the wheel mount and being disposed above the lower frame member; and an upper frame arm of the vehicle frame extending from the steering head and being movably coupled with the upper frame member at a location between the steering head and the wheel mount, wherein the upper frame member is movable relative to the upper frame arm and the lower frame member is movable relative to the lower frame arm, each in rotation centered around a pivot axis disposed between the upper frame arm and the lower frame arm, wherein the upper frame member is slidable relative to the upper frame arm and the lower frame member is slidable relative to the lower frame arm between an unrotated position and a rotated position, the upper frame member and the upper frame arm being substantially aligned in the unrotated position, the lower frame member and the lower frame arm being substantially aligned in the unrotated position.

14. A suspension mechanism for a vehicle having a wheel mount for a wheel, a steering head for a steering handle, and a vehicle frame, the suspension mechanism comprising:

a lower frame member of the vehicle frame extending from the wheel mount;

a lower frame arm of the vehicle frame extending from the steering head and being movably coupled with the lower frame member at a location between the steering head and the wheel mount;

an upper frame member of the vehicle frame extending from the wheel mount and being disposed above the lower frame member; and an upper frame arm of the vehicle frame extending from the steering head and being movably coupled with the upper frame member at a location between the steering head and the wheel mount, wherein the upper frame member is movable relative to the upper frame arm and the lower frame member is movable relative to the lower frame arm, each in rotation centered around a pivot axis disposed between the upper frame arm and the lower frame arm, wherein the upper frame arm includes at least one upper guide channel, wherein the upper frame member includes at least one upper guide pin connected with the at least one upper guide channel to slide along the at least one upper guide channel, wherein the lower frame arm includes at least one lower guide channel, and wherein the lower frame member includes at least one lower guide pin connected with the at least one lower guide channel to slide along the at least one lower guide channel.

15. A suspension mechanism for a vehicle having a wheel mount for a wheel, a steering head for a steering handle, and a vehicle frame, the suspension mechanism comprising:

an upper frame member of the vehicle frame extending from the wheel mount; and an upper frame arm of the vehicle frame extending from the steering head and being movably coupled with the upper frame member at a location between the steering head and the wheel mount, the upper frame member being slidable relative to the upper frame arm along an upper arcuate path centered around a pivot axis disposed below the upper frame and between the steering head and the wheel mount, the upper frame arm comprising a tube which houses a shock absorber, the shock absorber being coupled with the upper frame member to absorb shock during movement of the upper frame arm relative to the upper frame member, the upper arcuate path being formed in an upper guide channel in one of the upper frame arm and the upper frame member.

16. The suspension mechanism of claim 15 wherein the shock absorber comprises a hydraulic piston disposed in a hydraulic housing in the upper frame arm and a drive rod attached to the hydraulic piston, the hydraulic housing containing a compressed gas, the drive rod being coupled with the upper frame member to move the upper frame member relative to the upper frame arm from an unrotated position to a rotated position along the upper arcuate path.

17. The suspension mechanism of claim 15 wherein the upper frame arm includes an upper guide channel forming the upper arcuate path, and wherein the upper frame member includes a plurality of upper guide pins connected with the upper guide channel to slide along the upper guide channel.

18. The suspension mechanism of claim 17 wherein the upper frame arm includes a retainer member which retains the upper guide pins in the upper guide channel to move along the upper guide channel.

19. The suspension mechanism of claim 17 wherein the upper frame arm includes a Teflon slide plate in the upper guide channel on which the upper guide pins slide.

20. The suspension mechanism of claim 15 further comprising at least one bearing disposed between the upper frame member and the upper frame arm to facilitate sliding movement therebetween.

* * * * *